United States Patent Office 3,151,136
Patented Sept. 29, 1964

3,151,136
PROCESS OF PREPARING FATTY ACID ESTERS OF HYDROXYALKANE SULFONIC ACIDS
Eduard Koczorowski, Am Grunzug 351, Hamburg 24, Germany, Lojo Habicht, Aumuhle, near Hamburg, and Arno Kluge, Bad Soden, Taunus, Germany, assignors, by mesne assignments, to Eduard Koczorowski
No Drawing. Filed June 24, 1960, Ser. No. 38,439
Claims priority, application Germany July 29, 1959
8 Claims. (Cl. 260—400)

The present invention relates to a novel process of preparing fatty acid esters of hydroxyalkane sulfonic acids and salts thereof, such as the alkali, ammonium and amine salts.

It is well known to prepare such compounds, e.g. the sodium salts of fatty acid esters of isethionic acid, by reacting fatty acid chloride with sodium isethionate:

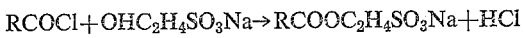

For this process, however, a finely powdered, fully dry sodium isethionate is needed, preparation of which is rather tedious, and a reaction time of several hours is required. The product can thus only be made batch-wise.

It has thus been proposed to esterify the fatty acid directly with sodium isethionate employing reduced pressure:

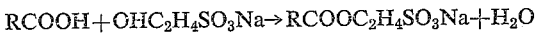

This process, however, requires a high excess of sodium isethionate and high temperatures from 200 to 300° C. In order to avoid too strong a discoloration of the products, the process has to be carried through under the cover of an inert gas. Moreover, the reaction is incomplete despite several hours of reaction time so that the excessive fatty acid has to be distilled off.

It is also known to esterify fatty acids in a high excess with salts of hydroxyalkane sulfonic acids employing phosphoric acids as catalysts. These reactions are conducted also at 185 to 300° C. in presence of an inert gas. The reaction time is reduced to ½ to 2 hours, but the esterification is also incomplete.

According to a similar known process, boric acid is used as a catalyst at temperatures higher than 200° C.

It is known that it is possible to esterify castor oil or a mixture of fatty acids having from 6 to 12 carbon atoms with sodium isethionate at low temperatures from 30 to 40° C. by passing hydrogen chloride through the reaction mass. This reaction proceeds very slowly and incompletely, and it is difficult to remove the salts present in the reaction product. In this process, it may be presumed that a part of the sodium isethionate is converted to isethionic acid by the hydrochloric acid, but the use of the gaseous hydrogen chloride is inconvenient and time-consuming. Furthermore, this process can be conducted only in batch operation; and the esterification is incomplete and the esterification product is impure.

It has now been found that it is possible to prepare fatty acid esters of hydroxyalkane sulfonic acids, as well as their salts such as the alkali metal, ammonium or amine salts, very easily and within very short reaction times and with practically quantitative yield which comprises conducting the esterification of the hydroxyalkane sulfonic acid which is substantially free from its salts with fatty acids while simultaneously removing the water formed, preferably under reduced pressure and at temperatures between about 100 and 150° C. The sulfonic acid may contain a minor proportion of its salts of not more than 50% by weight, and preferably less than 10% of its salts. The invention comprises, neutralizing the reaction product if desired. A special embodiment of the invention comprises introducing the hydroxyalkane sulfonic acid into a fatty acid previously heated to about 100 to 120° C. and maintained under reduced pressure, and completing the esterification by heating the reaction mass to about 130 to 150° C. Another feature involves dissolving the reaction components in a common solvent, e.g. in a sulfonic acid and preferably in an esterification product previously obtained, and completing the esterification, preferably under reduced pressure, by removing the water formed. The removal of water may be accelerated, thus making the process especially economical, by conducting the esterification continuously in a thin layer.

The neutralization of the ester-sulfonic acid may be conducted in a continuous operation. Any suitable neutralizing agent may be used, such as concentrated solutions of alkali silicates or mixtures thereof with concentrated alkali lye.

In the following description, the process is illustrated by the example of an esterification of isethionic acid with coconut oil fatty acid.

A technically pure isethionic acid containing about 3% of water and a fatty acid mixture derived from coconut oil were dissolved at various mole ratios in about 20%, based on the total weight of both the starting acids, of a previously obtained coconut oil fatty acid-isethionic acid ester while heating the mass to 80° C. The solution obtained does not separate on cooling.

The following degrees of esterification were found:

| Mole ratio of components | | | Degree of esterification, percent |
|---|---|---|---|
| Coconut oil fatty acid | Isethionic acid | Estersulfonic acid | |
| 1 | 1 | 0.2 | 66 |
| 1.1 | 1 | 0.2 | 73 |
| 1 | 1.1 | 0.2 | 72 |
| 1.2 | 1 | 0.2 | 77 |
| 1 | 1.2 | 0.2 | 76 |
| 1 | 2 | 0.2 | 87 |

This table shows that an ester-equilibrium is established. In accordance with the present invention, the reaction is completed by the removal of water from the system which is achieved in the following manner:

A homogeneous phase of said reaction mix containing an excess of 0.1 mole fatty acid and being previously heated to 80° C. was passed in thin layer through a vertical glass coil surrounded by a glycerine bath which was maintained at 175° C. The glass coil having a total length of 2400 mm. was kept under a vacuum of 20 mm. Hg. Within a throughput time of only about 90 seconds, a quantitative esterification was obtained. The ester-sulfonic acid was leaving the exit at a temperature of between 135 and 140° C.

It has also been found that the esterification is not essentially affected if the isethionic acid contains a certain amount of sodium isethionate, the sodium salt content however must be less than about 50% if, at said conditions, an esterification of more than 90% shall be achieved. The esterification proceeds more quickly if the salt content of the isethionic acid is not greater than 25% and preferably not greater than 10%.

Similar conditions apply to other hydroxyalkane-sulfonic acids such as 2-hydroxypropane-sulfonic acid, di-hydroxypropane-sulfonic acid, 2-hydroxybutane-3-sulfonic acid, 2-hydroxybutane-1-sulfonic acid, or likewise halogenated acids such as 1-chloro-2-hydroxypropane-sulfonic acid.

The esterification may be conducted also in a manner which comprises mixing equivalent amounts of a fatty acid and a hydroxyalkane sulfonic acid by stirring under vacuum, preferably employing 5 to 10% excess of one of the reactants, and raising the temperature slowly, in order to avoid excessive foaming, to 130 to 150° C.

In this working procedure, two layers are present initially which are to be mixed thoroughly and which combine into one homogeneous phase only with progressive reaction. It is advantageous to introduce the hydroxyalkane sulfonic acid slowly into the fatty acid, previously heated to about 100 to 120° C. and kept under vacuum, and to raise the temperature to about 130 to 150° C. after the components have been combined.

Another practical working method comprises dissolving said reaction components in a common solvent, e.g. in a sulfonic acid and preferably in a heel or pool of their esterification product as previously prepared, and completing the esterification either discontinuously or continuously at reduced pressure.

The water of reaction may be removed also by azeotropic distillation employing aromatic hydrocarbons such as toluene or xylene.

The free hydroxy-alkane sulfonic acids to be esterified may be obtained by treating a concentrated solution of the sodium salt with hydrochloric acid or gaseous hydrogen chloride, and separating the sodium chloride formed from the aqueous sulfonic acid solution in a conventional way. The hydroxyalkane sulfonic acids may also be produced advantageously by treating concentrated aqueous solutions of their sodium or potassium salts with ion exchangers. The aqueous solutions thus obtained are then concentrated by evaporation to a moisture content of about 3 to 8%.

The most suitable fatty acids which may be employed in the present process comprise those having from 8 to 22 carbon atoms, particularly the saturated fatty acids, e.g. from hydrogenated natural fats such as coconut oil, palm kernel oil or tallow. Their iodine values should be a maximum of 8 and preferably less than 4. The alkali metal, ammonium and amine salts, particularly the alkanolamine salts, of the ester-sulfonic acids made thereof are especially suitable as wetting, washing and penetrating agents. The salts of ester-sulfonic acids from saturated fatty acids having from 10 to 14 carbon atoms are particularly useful.

The neutralization of the ester-sulfonic acids to their salts may be carried through batch-wise or in a continuous operation. The known processes were substantially limited to the production of the sodium salts. According to the present invention, not only the various alkali metal salts but also the ammonium and amine salts, e.g. the alkanolamine compounds, may be prepared. The production of these salts would hardly be possible or would encounter very great difficulties with the known processes.

During neutralization of the ester-sulfonic acids, of course a saponification should be avoided. Since the salts of the ester-sulfonic acids show a much lesser tendency to hydrolyze than the sulfonic acid itself, the ester-sulfonic acid is preferably introduced into the alkaline medium in batch operations, and not vice versa.

The production of the ammonium or alkanolamine salts such as the tri-, di- and monoethanolamine salts does not encounter any difficulty. The reaction requires only adding the moderately heated liquid sulfonic acid with thorough stirring to an aqueous ammonia or amine solution. Alternatively, the sulfonic acid may be directly combined with an alkanolamine by kneading.

Correspondingly, the production of alkali metal salts of the ester-sulfonic acids may be carried through by introducing the acid into an alkali metal carbonate solution. There is no appreciable hydrolysis with the use of this method. It has been found, however, impossible to run the neutralization in a satisfactory manner with lyes such as sodium hydroxide solution since, due to the high alkalinity of the sodium hydroxide solution, the ester group is saponified, especially if a lye of high concentration is used. For the production of products with low moisture content, e.g. for use in toilet bars, employment of highly-concentrated neutralizing agents would be desirable however.

It has now been found also that this problem can be solved and that neutralization of the ester-sulfonic acid can be conducted satisfactorily in the presence of low proportions of water by using concentrated solutions of alkali metal silicates or mixtures of alkali metal silicate solutions with concentrated alkali lyes as neutralizing agents. Thus, by neutralizing with a commercial highly-concentrated sodium silicate solution, if desired in mixture with a commercial highly-concentrated sodium hydroxide solution, the neutralization product is obtained generally as a powdery mass which usually needs no further drying.

In the following examples the parts given are all by weight.

*Example 1*

Isethionic acid containing 7% of water and being practically free of its salts (136 parts) is added with stirring during the course of about one hour at same mole ratio to lauric acid (200 parts) which is maintained at about 110° C. and under a vacuum of 20–30 mm. Hg. After the isethionic acid has been introduced, the esterification is completed by raising the temperature to about 135° C. for about 15 to 30 minutes which removes the initial water content and the water of condensation produced by the reaction.

The ester-sulfonic acid is obtained as a brown oil with a yield of about 96%. It is neutralized by kneading with triethanolamine whereby a light-yellow paste is obtained.

*Example 2*

165 parts of hydroxypropane-sulfonic acid (about 10% excess) containing about 5% of water and about 10% of its sodium salt and 200 parts of lauric acid are dissolved in a heel of 150 parts of their esterification product by heating the mixture to about 80° C. The reaction mix is then heated, under a vacuum of about 20 to 40 mm. Hg, to about 150° C. during the course of about one hour, in order to remove the water content and finish the esterification. The ester-sulfonic acid, which is obtained at a yield of 95%, is neutralized by adding it to an ammonia solution with stirring to obtain a yellow solution.

*Example 3*

185 parts of chlorohydroxypropane-sulfonic acid containing about 6% of water and 8% of its sodium salt are mixed with about 250 parts of myristic acid (about 10% excess) by stirring under a vacuum. Avoiding excessive foaming, the temperature is slowly raised during about 60 to 80 minutes from below 100° C. to about 150° C. which evaporates the water content. The ester-sulfonic acid is obtained with a yield of above 90% and is neutralized by kneading it with a concentrated sodium carbonate solution. The resulting almost colorless powder is a good foaming and washing active agent with good lime soap-dispersing capacity.

*Example 4*

140 parts of isethionic acid containing about 3 to 8% of water and 5 to 10% of its sodium salt and 225 parts of a fatty acid mixture derived from hydrogenated coconut oil are dissolved by heating to 80° C. in 100 parts of an ester-sulfonic acid obtained in a previous operation by esterification of these components. The homogeneous liquid phase which is maintained at a temperature of about 60 to 80° C. is passed continuously in a thin layer under vacuum through an externally heated coil of such a length which allows evaporation of the initial moisture and the water of reaction. Thus the coil may have, e.g., a length of from 1.50 to 8 meters or more, depending on the throughput rate and the thickness of the layer passing through as well as on the temperature. The coil may be heated by a heating bath containing a suitable heating liquid such as glycerine or diphenyl which is maintained at 130 to 200° C. However, any other suitable device allowing an efficient evaporation of the water may be used also.

The ester-sulfonic acid leaving the coil is neutralized by proportionating about 440 parts of ester-sulfonic acid with about 220 parts of an alkaline neutralizing agent consisting of about 55 parts of a 50% sodium hydroxide solution and 165 parts of a sodium disilicate solution 45° Bé. in a continuous stream through a homogenizer. The homogenizer may suitably consist of a teethed disc mill, the teeth effecting a thorough mixing of the components. The neutral washing active material leaves the mill as a a light-yellow caking powder, which may be used as a base for toilet bars.

The 220 parts of the aforesaid neutralizing agent may also be replaced, omitting the alkali lye, by 250 parts of a sodium disilicate solution 55° Bé.

What is claimed is:

1. The process of preparing a fatty acid ester of an hydroxyalkane sulfonic acid compound in high yield which comprises heating fatty acid and an hydroxyalkane sulfonic acid which is substantially free from its salts at a temperature from about 100 to 150°C. for a period of time up to about 1½ hours and forming the fatty acid ester of said hydroxyalkane sulfonic acid while simultaneously removing the water of reaction formed thereby to complete the esterfication and produce said ester in a yield of at least about 90%.

2. A process in accordance with claim 1 which comprises neutralizing the ester reaction product to form a salt selected from the group consisting of the alkali metal, ammonium and amine salts of said fatty acid ester of hydroxyalkane sulfonic acid salt.

3. The process of preparing a fatty acid ester of an hydroxyalkane sulfonic acid which comprises introducing the hydroxyalkane sulfonic acid containing not more than a minor proportion of salts of said sulfonic acid into a fatty acid previously heated to about 100 to 120° C. and maintained under reduced pressure, and heating the reaction mixture to 130 to 150° C. for a period of time up to about 1½ hours and removing the water of reaction formed thereby during the course of the reaction to complete the esterification, and form a fatty acid ester of said hydroxyalkane sulfonic acid in a yield of at least about 90%.

4. The process of preparing a fatty acid ester of an hydroxyalkane sulfonic acid which comprises dissolving the hydroxyalkane sulfonic acid which is substantially free from its salts, with fatty acids in a common solvent, heating the reaction mixture under reduced pressure and at a temperature between about 100 and 150° C. for a period of time up to about 1½ hours, forming the fatty acid ester of said hydroxyalkane sulfonic acid and removing the water of reaction formed thereby during the course of the reaction to complete the esterification and obtain a yield of at least about 90%.

5. A process according to claim 4 which comprises dissolving the hydroxyalkane sulfonic acid and fatty acid in a pool of previously prepared fatty acid ester of hydroxyalkane sulfonic acid.

6. A process in accordance with claim 4 which comprises establishing the reaction mixture in a thin layer of material maintained under said reduced pressure and removing the water therefrom.

7. A process according to claim 4 which comprises neutralizing the ester reaction product with a concentrated solution of alkaline material selected from the group consisting of alkali metal silicate and mixtures thereof with alkali metal hydroxide.

8. A process of preparing a fatty acid ester of isethionic acid in high yield which comprises esterifying the fatty acid with isethionic acid containing not more than 10% of its salts while simultaneously removing the water formed thereby under reduced pressure and at a temperature between 100 and 150° C. for a period of time up to about 1½ hours to complete the esterification, and forming the fatty acid ester of isethionic acid in a yield of at least about 90%.

References Cited in the file of this patent

UNITED STATES PATENTS

| | | |
|---|---|---|
| 1,881,172 | Daimler et al. | Oct. 4, 1932 |
| 2,923,724 | Anderson et al. | Feb 2, 1960 |